United States Patent
Lu

(10) Patent No.: US 12,472,462 B2
(45) Date of Patent: Nov. 18, 2025

(54) SERIES-CONNECTED ABSORPTION HIGH-GRAVITY DEVICE

(71) Applicant: Higee Co., Ltd., New Taipei (TW)

(72) Inventor: Yu-Tseng Lu, New Taipei (TW)

(73) Assignee: HIGEE CO., LTD., New Taipei (TW)

( * ) Notice: Subject to any disclaimer, the term of this patent is extended or adjusted under 35 U.S.C. 154(b) by 319 days.

(21) Appl. No.: 18/472,969

(22) Filed: Sep. 22, 2023

(65) Prior Publication Data

US 2025/0099910 A1   Mar. 27, 2025

(51) Int. Cl.
| | |
|---|---|
| *B01D 53/18* | (2006.01) |
| *B01D 53/78* | (2006.01) |
| *B01D 53/06* | (2006.01) |
| *B01D 53/14* | (2006.01) |
| *B01D 53/24* | (2006.01) |

(Continued)

(52) U.S. Cl.
CPC ............. *B01D 53/18* (2013.01); *B01D 53/78* (2013.01); *B01D 53/06* (2013.01); *B01D 53/1493* (2013.01); *B01D 53/24* (2013.01); *B01D 2258/0283* (2013.01); *B01J 4/001* (2013.01); *B01J 19/18* (2013.01)

(58) Field of Classification Search
CPC ........ B01D 53/18; B01D 53/78; B01D 53/06; B01D 53/1493; B01D 53/24; B01D 2258/0283; B01J 4/001; B01J 19/18
See application file for complete search history.

(56) References Cited

U.S. PATENT DOCUMENTS

| | | | | |
|---|---|---|---|---|
| 2004/0265199 | A1* | 12/2004 | MacKnight | ........ B01D 53/1412 423/220 |
| 2005/0022666 | A1* | 2/2005 | Liu | ........ B01D 53/24 95/207 |

(Continued)

FOREIGN PATENT DOCUMENTS

| | | | |
|---|---|---|---|
| CN | 204320312 U | * | 5/2015 |
| CN | 105289451 A | * | 2/2016 |

(Continued)

OTHER PUBLICATIONS

Search Report appended to an Office Action, which was issued to Taiwanese counterpart application No. 111110834 by the TIPO on Oct. 24, 2022, with an English translation thereof.

(Continued)

*Primary Examiner* — Stephen Hobson
(74) *Attorney, Agent, or Firm* — HSML P.C.

(57) ABSTRACT

A series-connected absorption high-gravity device includes a housing, a rotating bed unit, a rotating shaft connected to the rotating bed unit, a scrubber layer, a blocking plate unit, and a guiding tube. The rotatable bed unit is disposed in the housing and defines a fluid-flowing space therein. The scrubber layer is disposed in the housing, is disposed above and spaced apart from the rotating bed unit, and cooperates with the rotating bed unit to define an airflow space therebetween. The blocking plate unit is disposed in the airflow space and includes a top blocking plate and a bottom blocking plate formed with a bottom through hole. The bottom through hole has a projection area along an axis of the rotating shaft smaller than a projection area of the top blocking plate and falling entirely therewithin. The guiding tube introduces a fluid into the fluid-flowing space.

13 Claims, 4 Drawing Sheets

(51) Int. Cl.
*B01J 4/00* (2006.01)
*B01J 19/18* (2006.01)

(56) References Cited

U.S. PATENT DOCUMENTS

| | | | | |
|---|---|---|---|---|
| 2013/0192471 | A1* | 8/2013 | Kim | B01D 46/42 96/265 |
| 2014/0128654 | A1* | 5/2014 | Fang | B01J 19/006 422/607 |
| 2020/0038804 | A1* | 2/2020 | Chu | B01D 53/78 |
| 2022/0355240 | A1* | 11/2022 | Licht | B01D 53/78 |
| 2022/0410063 | A1* | 12/2022 | Mobley | B01D 53/62 |

FOREIGN PATENT DOCUMENTS

| | | | | | |
|---|---|---|---|---|---|
| CN | 107803123 | A | * | 3/2018 | B01F 29/80 |
| CN | 108211725 | A | * | 6/2018 | C10K 1/14 |
| CN | 208018398 | U | | 10/2018 | |
| CN | 109999648 | A | * | 7/2019 | B01D 53/62 |
| CN | 110252238 | A | * | 9/2019 | B01D 53/78 |
| CN | 110339675 | A | * | 10/2019 | B01D 53/1493 |
| CN | 110755970 | A | * | 2/2020 | B01D 50/20 |
| CN | 110833757 | A | * | 2/2020 | B01D 53/50 |
| CN | 111298627 | A | * | 6/2020 | B01D 53/78 |
| CN | 111375366 | A | * | 7/2020 | B01D 53/1406 |
| CN | 111380377 | A | * | 7/2020 | B01D 53/18 |
| CN | 111974184 | A | * | 11/2020 | B01D 53/502 |
| CN | 112933885 | A | * | 6/2021 | B01D 53/14 |
| CN | 113385009 | A | * | 9/2021 | B01D 36/001 |
| CN | 113559694 | A | * | 10/2021 | B01D 29/56 |
| CN | 114950080 | A | * | 8/2022 | B01D 53/18 |
| CN | 116574544 | A | * | 8/2023 | C10L 3/103 |
| MY | 189816 | A | * | 3/2022 | |

OTHER PUBLICATIONS

Notice of Allowance issued to Taiwanese counterpart application No. 111110834 by the TIPO on Apr. 20, 2023, with an English translation thereof.

* cited by examiner

SERIES-CONNECTED ABSORPTION HIGH-GRAVITY DEVICE

FIELD

The disclosure relates to a high-gravity device, and more particularly to series-connected absorption high-gravity device.

BACKGROUND

In waste gas processing, a plurality of waste gas processing devices (e.g., a high-gravity device, a scrubbing tower, an active carbon adsorption tower, a dust collection equipment, etc.) are usually connected in series to remove various pollutants (e.g., sulfur oxide, nitrogen oxide, carbon dioxide, particulate matters, etc.) from waste gas (e.g., flue exhaust gas), and hence occupy a relatively large space.

To reduce space occupied by the waste gas processing devices, a plurality of exhaust gas processing devices for processing various pollutants are arranged into a single assembly. However, different scrubbing solutions such as alkaline liquid, acidic liquid, water that are used in the exhaust gas processing devices may become mixed, thereby adversely affecting absorption performance of the exhaust gas processing devices.

SUMMARY

Therefore, an object of the disclosure is to provide a series-connected absorption high-gravity device that can alleviate at least one of the drawbacks of the prior art.

According to an aspect of the disclosure, a series-connected absorption high-gravity device includes a housing, a rotating bed unit, a rotating shaft, a scrubber layer, a blocking plate unit, a guiding tube, and a scrubbing solution dispersing unit. The housing has a gas inlet adapted for introducing a gas flow into the housing, a gas outlet, an upper fluid discharging opening, and a lower fluid discharging opening disposed at a bottom portion of the housing. The rotatable bed unit is disposed in the housing, is spaced apart from the housing, and defines a fluid-flowing space therein. The rotating shaft is connected to the rotating bed unit and extends outwardly of the housing from the rotating bed unit. The scrubber layer is disposed in the housing, is disposed above and spaced apart from the rotating bed unit, and cooperates with the rotating bed unit to define an airflow space therebetween. The gas outlet is disposed at a top portion of the housing and adapted for guiding a gas flow to flow out of the housing. The blocking plate unit is disposed in the airflow space and includes a bottom blocking plate and a top blocking plate. The bottom blocking plate is connected fluid-tightly to the housing, has an upper surface and a lower surface that is opposite to the upper surface, and is formed with a bottom through hole that extends through the upper surface and the lower surface, and that is in fluid communication with the fluid-flowing space and the airflow space. The upper fluid discharging opening is disposed adjacent to the upper surface of the bottom blocking plate. The top blocking plate is disposed above and spaced apart from the bottom blocking plate, is spaced apart from the housing, and is configured to cover the bottom through hole along an axis of the rotating shaft. The guiding tube extends from an exterior of the housing into the fluid-flowing space, and is adapted to introduce a fluid into the fluid-flowing space. The scrubbing solution dispersing unit is adapted to disperse a scrubbing solution into the scrubber layer.

According to another aspect of the present disclosure, a series-connected absorption high-gravity device includes housing, a rotating bed unit, a rotating shaft, a scrubber layer, a blocking plate unit, a guiding tube, and a scrubbing solution dispersing unit. The housing has a gas inlet adapted for introducing a gas flow into the housing, a gas outlet, an upper fluid discharging opening, and a lower fluid discharging opening disposed at a bottom portion of the housing. The rotatable bed unit is disposed in the housing, is spaced apart from the housing, and defines a fluid-flowing space therein. The rotating shaft is connected to the rotating bed unit and extends outwardly of the housing from the rotating bed unit. The scrubber layer is disposed in the housing, is disposed above and spaced apart from the rotating bed unit, and cooperates with the rotating bed unit to define an airflow space therebetween. The gas outlet is disposed at a top portion of the housing and adapted for guiding a gas flow to flow out of the housing. The blocking plate unit is disposed in the airflow space and includes a bottom blocking plate, an intermediate blocking plate, and at least one top blocking plate. The bottom blocking plate is connected fluid-tightly to the housing, has an upper surface and a lower surface that is opposite to the upper surface, and is formed with a bottom through hole that extends through the upper surface and the lower surface, and that is in fluid communication with the fluid-flowing space and the airflow space. The upper fluid discharging opening is disposed adjacent to the upper surface of the bottom blocking plate. The intermediate blocking plate is disposed above and spaced apart from the bottom blocking plate, is spaced apart from the housing, has a top surface and a bottom surface that is opposite to the top surface, and is formed with at least one intermediate through hole that extends through the top surface and the bottom surface. The bottom through hole has a projection area along an axis of the rotating shaft that is smaller than a projection area of the intermediate blocking plate and that falls entirely within the projection area of the intermediate blocking plate. The at least one top blocking plate is disposed above and spaced apart from the intermediate blocking plate, and is spaced apart from the housing. The intermediate through hole has a projection area along the axis of the rotating shaft that is smaller than a projection area of the top blocking plate and that falls entirely within the projection area of the top blocking plate. The guiding tube extends from an exterior of the housing into the fluid-flowing space, and is adapted to introduce a fluid into the fluid-flowing space. The scrubbing solution dispersing unit is adapted to disperse a scrubbing solution into the scrubber layer.

According to still another aspect of the present disclosure, a series-connected absorption high-gravity device includes a housing, a rotating bed unit, a rotating shaft, a scrubber layer, a blocking plate unit, a guiding tube, and a scrubbing solution dispersing unit. The housing has a gas inlet adapted for introducing a gas flow into the housing, a gas outlet, an upper fluid discharging opening, and a lower fluid discharging opening disposed at a bottom portion of the housing. The rotatable bed unit is disposed in the housing, is spaced apart from the housing, and defines a fluid-flowing space therein. The rotating shaft is connected to the rotating bed unit and extends outwardly of the housing from the rotating bed unit. The scrubber layer is disposed in the housing, is disposed above and spaced apart from the rotating bed unit, and cooperates with the rotating bed unit to define an airflow space therebetween. The gas outlet is disposed at a top portion of the housing and adapted for guiding a gas flow to flow out of the housing. The blocking plate unit is disposed in the airflow space and includes a bottom blocking plate, an intermediate blocking plate, an auxiliary blocking plate, and a top blocking plate. The bottom blocking plate is connected fluid-tightly to the housing, has an upper surface and a lower surface that is opposite to the upper surface, and is formed with a bottom through hole that extends through the upper surface and the lower surface, and that is in fluid communication with the fluid-flowing space and the airflow space. The upper fluid discharging opening is disposed adjacent to the upper surface of the bottom blocking plate. The intermediate blocking plate is disposed above and spaced apart from the bottom blocking plate, is spaced apart from the housing, has a top surface and a bottom surface that is opposite to the top surface, and is formed with an intermediate through hole that extends through the top surface and the bottom surface. The bottom through hole has a projection area along an axis of the rotating shaft that is smaller than a projection area of the intermediate blocking plate and that falls entirely within the projection area of the intermediate blocking plate. The auxiliary blocking plate is disposed above and spaced apart from the intermediate blocking plate, is spaced apart from the housing, has an auxiliary top surface and an auxiliary bottom surface that is opposite to the auxiliary top surface, and is formed with an auxiliary through hole that extends through the auxiliary top surface and the auxiliary bottom surface. The intermediate through hole has a projection area along the axis of the rotating shaft that is smaller than a projection area of the auxiliary blocking plate and that falls entirely within the projection area of the auxiliary blocking plate. The top blocking plate is disposed above and spaced apart from the auxiliary blocking plate, and is spaced apart from the housing. The auxiliary through hole has a projection area along the axis of the rotating shaft that is smaller than a projection area of the top blocking plate and that falls entirely within the projection area of the top blocking plate. The guiding tube extends from an exterior of the housing into the fluid-flowing space, and is adapted to introduce a fluid into the fluid-flowing space. The scrubbing solution dispersing unit is adapted to disperse a scrubbing solution into the scrubber layer.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
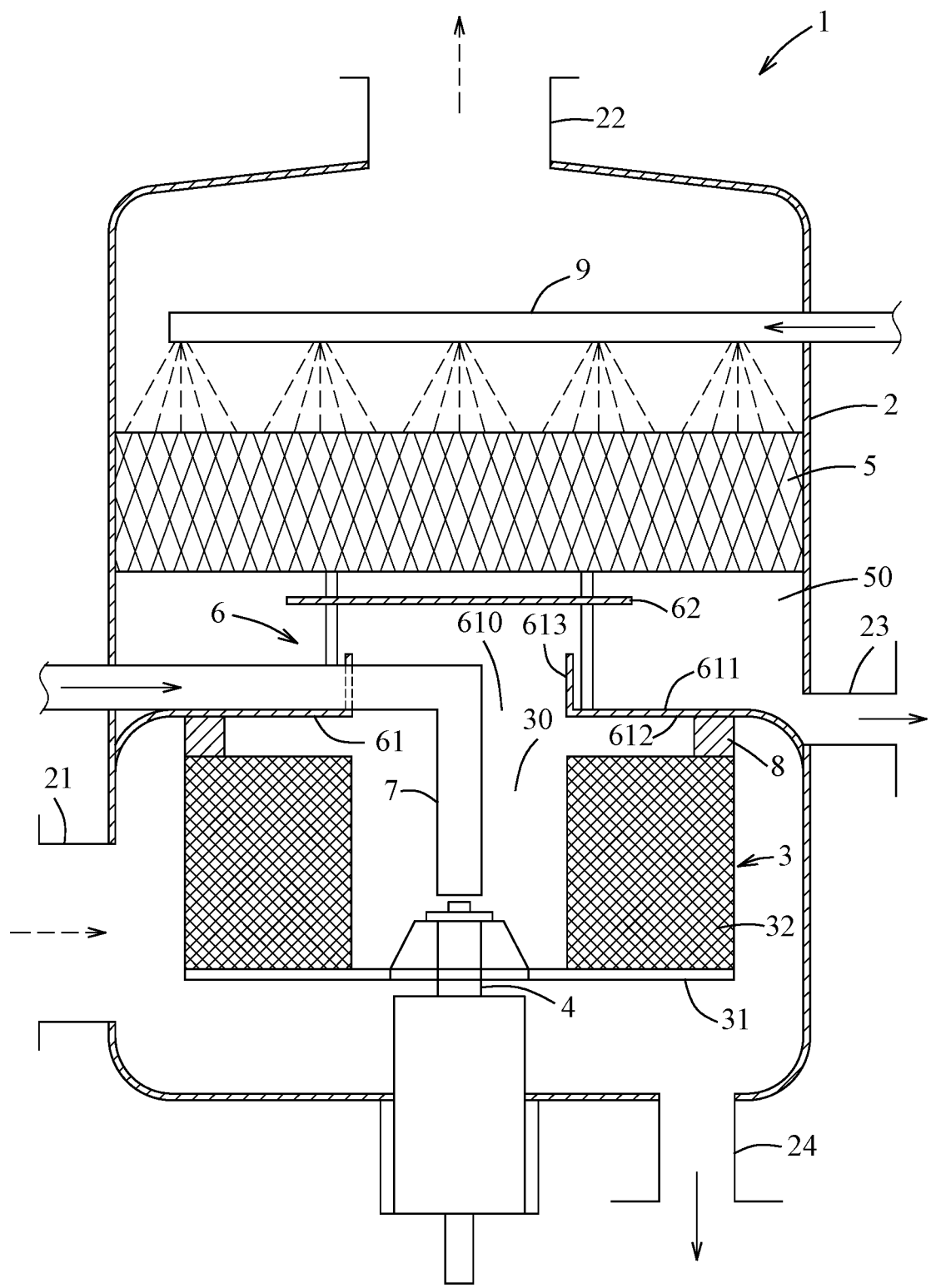
FIG. 1 is a schematic sectional view of a series-connected absorption high-gravity device of a first embodiment according to the present disclosure.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Referring to FIG. 1, a series-connected absorption high-gravity device 1 of a first embodiment according to the present disclosure is shown. The series-connected absorption high-gravity device 1 includes a housing 2, a rotating bed unit 3, a rotating shaft 4, a scrubber layer 5, a blocking plate unit 6, a guiding tube 7, a sealing member 8, and a scrubbing solution dispersing unit 9. In this embodiment, the sealing member 8 is a dynamic sealing member.

The housing 2 has a gas inlet 21, a gas outlet 22, an upper fluid discharging opening 23, and a lower fluid discharging opening 24. The gas inlet 21 is adapted for introducing a gas flow into the housing 2. The gas outlet 22 is disposed adjacent to a top portion of the housing 2 and is adapted for guiding the gas flow that has been processed to flow out of the housing 2. The upper fluid discharging opening 23 is disposed adjacent to the bottom blocking plate 61. The lower fluid discharging opening 24 is disposed at a bottom portion of the housing 2 and is adapted for guiding a fluid out of the housing 2.

The rotating bed unit 3 is disposed in and rotatable relative to the housing 2, is spaced apart from the housing 2, and defines a fluid-flowing space 30 therein. In this embodiment, the rotating bed unit 3 is a rotating packed bed. The rotating bed unit 3 includes a base plate 31, and a packed layer 32 extending upwardly from the base plate 31 and configured as a hollow cylinder. The base plate 31 and the packed layer 32 cooperatively define the fluid-flowing space 30 in a hollow portion of the packed layer 32. The packed layer 32 is one of a wire mesh, glass spheres, plastic fillers, activated carbon, zeolites, metal plates and a combinations thereof. It should be noted that the packed layer 32 may be a structured packing, e.g., corrugated sheets. In this embodiment, the gas inlet 21 is formed at one side of the housing 2 and is adapted for introducing a gas flow, i.e., waste gas to be processed, into the fluid-flowing space 30.

The rotating shaft 4 is connected to the rotating bed unit 3 and extends outwardly of the housing 2 from the rotating bed unit 3.

In this embodiment, the scrubber layer 5 is disposed in the housing 2, is disposed above and spaced apart from the rotating bed unit 3, and cooperates with the rotating bed unit 3 to define an airflow space 50 therebetween. In this embodiment, the scrubber layer 5 is a structured packing. The gas outlet 22 is adapted for guiding the gas flow that has been processed to flow out of the housing 2.

The blocking plate unit 6 is disposed in the airflow space 50 and includes a bottom blocking plate 61 and a top blocking plate 62. The bottom blocking plate 61 is connected fluid-tightly to the housing 2, has an upper surface 611, a lower surface 612, and a bottom blocking ring wall segment 613, and is formed with a bottom through hole 610. The lower surface 612 is opposite to and disposed under the upper surface 611. In this embodiment, the upper fluid discharging opening 23 is disposed adjacent to the upper surface 611 of the bottom blocking plate 61. The bottom blocking ring wall segment 613 extends upwardly from the upper surface 611 and surrounds the bottom through hole 610. The bottom through hole 610 extends through the upper surface 611 and the lower surface 612, and is in fluid communication with the fluid-flowing space 30 and the airflow space 50. The sealing member 8 interconnects the lower surface 612 of the bottom blocking plate 61 and a top portion of the rotating bed unit 3. The top blocking plate 62 is disposed above and spaced apart from the bottom blocking plate 61, is spaced apart from the housing 2, and extends in a radial direction transverse to the axis of said rotating shaft 4. The bottom through hole 610 has a projection area along the axis of the rotating shaft 4 that is smaller than a projection area of the top blocking plate 62 and that falls entirely within the projection area of the top blocking plate 62.

The guiding tube 7 extends from an exterior of the housing 2 through the bottom blocking ring wall segment 613 into the fluid-flowing space 30, and is adapted to introduce a fluid into the fluid-flowing space 30. The lower fluid discharging opening 24 is configured to guide the fluid that has been processed out of the fluid-flowing space 30.

The scrubbing solution dispersing unit 9 is disposed above the scrubber layer 5 and is adapted to disperse a scrubbing solution on a top surface of the scrubber layer 5. In this embodiment, the scrubbing solution is water that is introduced from an exterior of the housing 2, and the scrubbing solution dispersing unit 9 is a spraying tube.

When the rotating shaft 4 is driven by an external force to rotate, the rotating bed unit 3 is driven thereby to rotate relative to the housing 2, and a liquid, e.g., alkaline liquids, that is capable of absorbing acidic pollutants in the gas flow is sprayed into the fluid-flowing space 30 via a plurality of perforated holes (not shown) formed in the guiding tube 7. As the rotating bed unit 3 rotates, a centrifugal force is generated so the liquid is moved radially and outwardly from the fluid-flowing space 30 into the packed layer 32 and is dispersed into droplets, liquid filaments or liquid films. Meanwhile, a gas flow such as an exhaust gas containing pollutants, e.g., acidic and alkaline waste gas, is introduced into the housing 2 via the gas inlet 21 and flows radially and inwardly into the packed layer 32 toward the fluid-flowing space 30 and comes into contact with the liquid in a countercurrent manner. In this way, a rate of gas-liquid mass transfer is increased and the liquid absorbs a portion the pollutants in the gas flow.

Subsequently, the liquid that absorbs the portion of the pollutants (e.g., acidic gas) of the gas flow is guided to flow out of the housing 2 via the lower fluid discharging opening 24. The gas flow that has passed through the packed layer 32 and that may contain another portion of pollutants (e.g., alkaline gas) flows upwardly, passes through the bottom through hole 610, the airflow space 50, and a space between the housing 2 and the top blocking plate 62, and then evenly flows into the scrubber layer 5 and comes into contact with a scrubbing solution (e.g., acidic or neutral scrubbing solution) that is dispersed by the scrubbing solution dispersing unit 9 in a countercurrent manner. Thus, the scrubbing solution absorbs another portion of pollutants (e.g., alkaline gas), and the gas flow that has been processed flows out of the housing 2 through the gas outlet 22. Finally, the scrubbing solution that absorbs the another portion of pollutants (e.g., alkaline gas) flows along the top blocking plate 62 and the upper surface 611 of the bottom blocking plate 61 out of the housing 2 through the upper fluid discharging opening 23. It should be noted that, by virtue of the structures of the bottom blocking ring wall segment 613 and the bottom through hole 610 that has a projection area along the axis of the rotating shaft 4 smaller than the projection area of the top blocking plate 62 and falling entirely within the projection area of the top blocking plate 62, the scrubbing solution that absorbs pollutants does not flow into the fluid-flowing space 30 through the bottom through hole 610 and does not mix with the fluid in the fluid-flowing space 30 introduced by the guiding tube 7.

Figure 2:
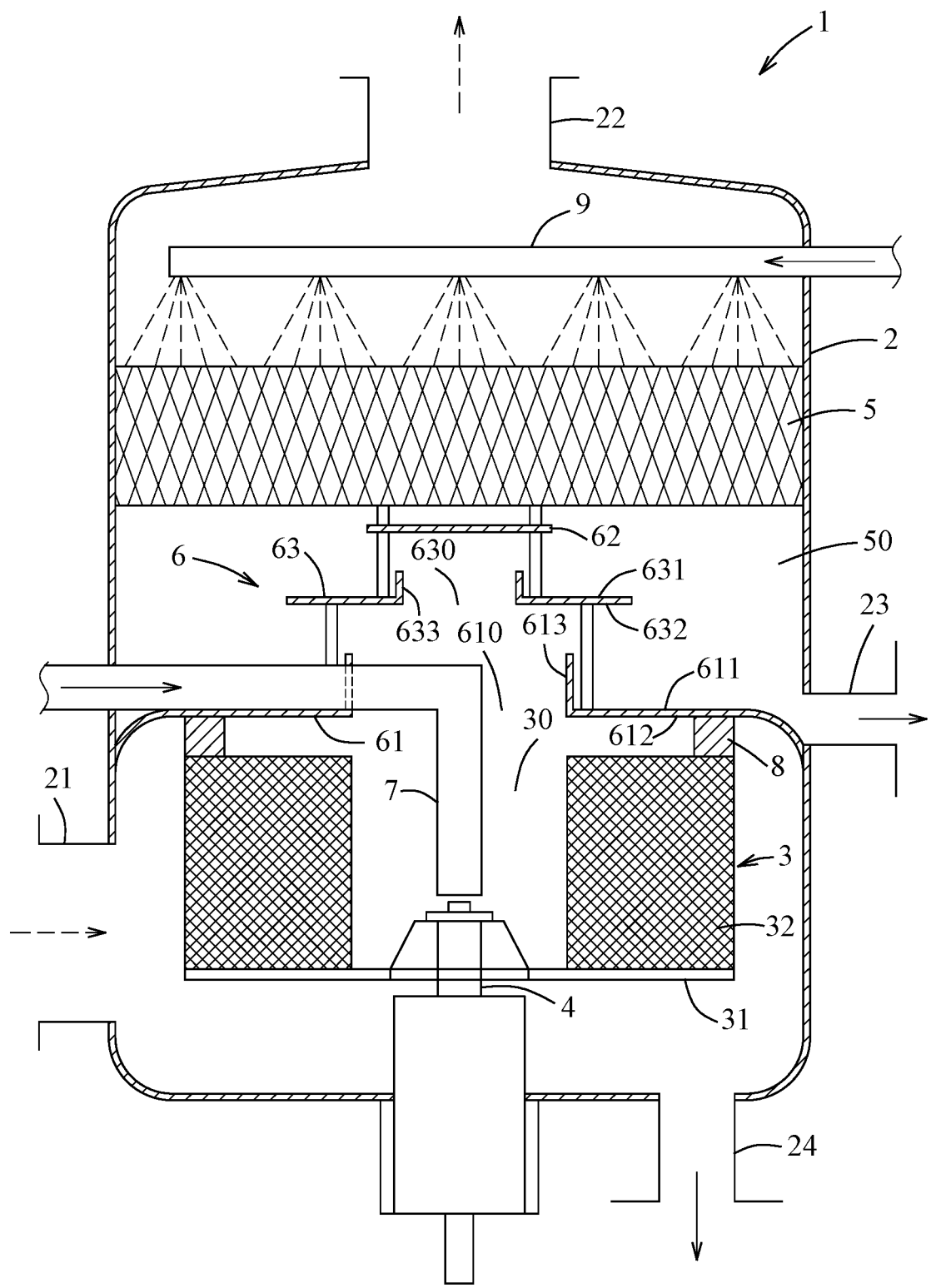
FIG. 2 is a schematic sectional view of a series-connected absorption high-gravity device of a second embodiment according to the present disclosure.

Referring to FIG. 2, the series-connected absorption high-gravity device 1 of a second embodiment according to the present disclosure is similar to the first embodiment and the differences between the first embodiment and the second embodiments reside in the following. In the second embodiment, the blocking plate unit 6 of the series-connected absorption high-gravity device 1 further includes an intermediate blocking plate 63. The intermediate blocking plate 63 is disposed above and spaced apart from the bottom blocking plate 61, is spaced apart from the housing 2, and extends in the radial direction transverse to the axis of the rotating shaft 4. The intermediate blocking plate 63 has a top surface 631, a bottom surface 632, and an intermediate blocking ring wall segment 633, and is formed with an intermediate through hole 630. The bottom surface 632 is opposite to and disposed under the top surface 631. The intermediate through hole 630 extends through the top surface 631 and the bottom surface 632. The intermediate blocking ring wall segment 633 extends upwardly from the top surface 631 and surrounds the intermediate through hole 630. In this embodiment, the bottom through hole 610 has a projection area along the axis of the rotating shaft 4 that is smaller than a projection area of the intermediate blocking plate 63 and that falls entirely within the projection area of the intermediate blocking plate 63. The top blocking plate 62 is disposed above and spaced apart from the intermediate blocking plate 63 and is spaced apart from the housing 2. The intermediate through hole 630 has a projection area along the axis of the rotating shaft 4 that is smaller than the projection area of the top blocking plate 62 and that falls entirely within the projection area of the top blocking plate 62.

In the second embodiment, a gas flow such as an exhaust gas containing a portion of pollutants (e.g., alkaline gas) that has passed through the packed layer 32 flows upwardly, passes through the bottom through hole 610, the intermediate through hole 630, a space between the intermediate blocking plate 63 and the housing 2, and a space between the top blocking plate 62 and the housing 2 in the airflow space 50, and then evenly flows into the scrubber layer 5 and comes into contact with a scrubbing solution that is dispersed by the scrubbing solution dispersing unit 9 in a countercurrent manner, so the scrubbing solution absorbs the portion of pollutants (e.g., alkaline gas), and then the gas flow that has been processed flows out of the housing 2 through the gas outlet 22. The scrubbing solution that absorbs the portion of pollutants (e.g., alkaline gas) flows sequentially along the top blocking plate 62, the top surface 631 of the intermediate blocking plate 63, and the upper surface 611 of the bottom blocking plate 61 out of the housing 2 through the upper fluid discharging opening 23. Similar to the first embodiment, in the second embodiment, by virtue of the structures of the intermediate blocking ring wall segment 633, the intermediate through hole 630 that has a projection area along the axis of the rotating shaft 4 smaller than the projection area of the top blocking plate 62 and falling entirely within the projection area of the top blocking plate 62, the bottom blocking ring wall segment 613, and the bottom through hole 610, the scrubbing solution does not flow into the fluid-flowing space 30, the intermediate through hole 630 or the bottom through hole 610, and does not mix with the fluid introduced into the fluid-flowing space 30 introduced by the guiding tube 7.

Figure 3:
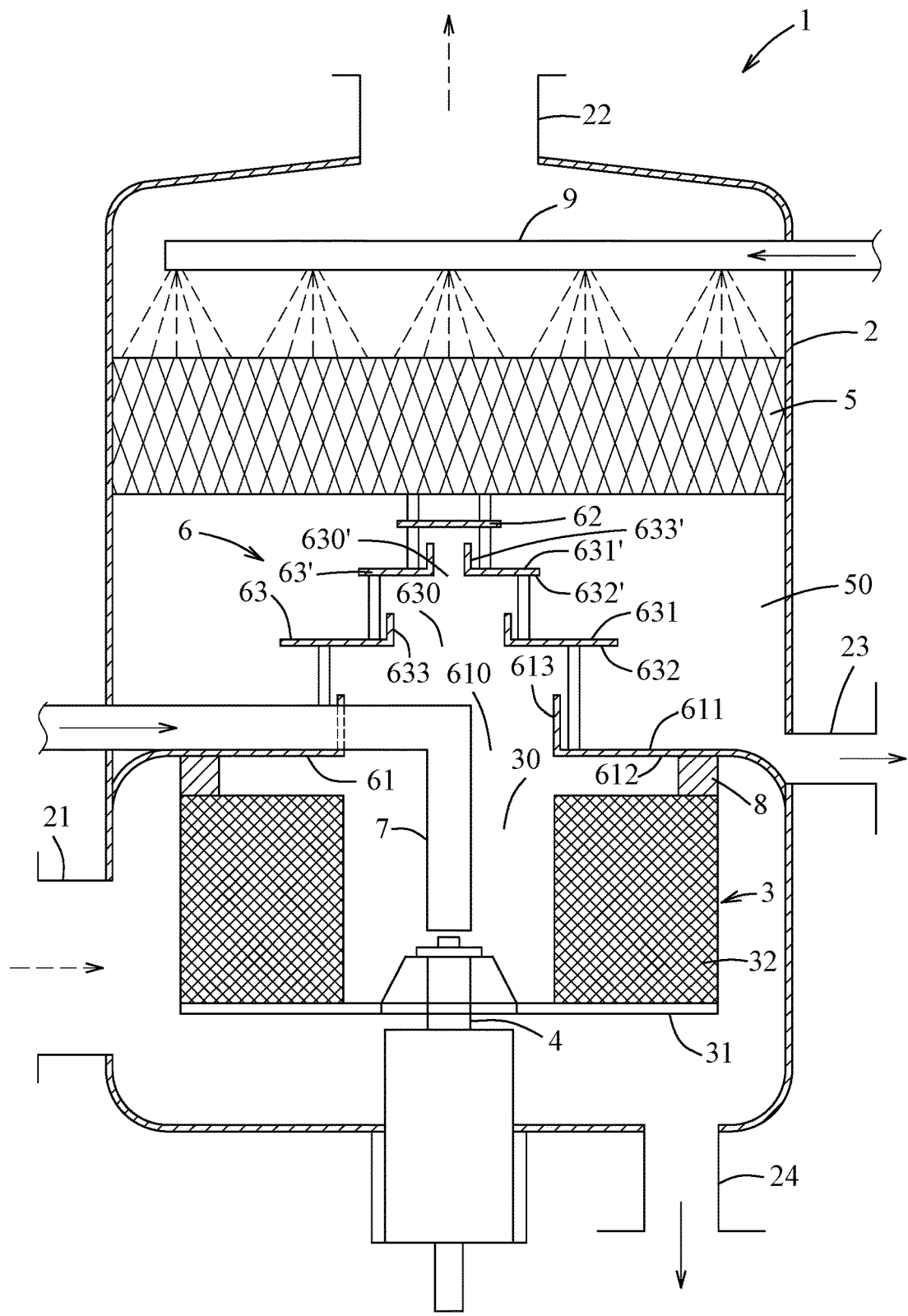
FIG. 3 is a schematic sectional view of a series-connected absorption high-gravity device of a third embodiment according to the present disclosure.

Referring to FIG. 3, the series-connected absorption high-gravity device 1 of a third embodiment according to the present disclosure is similar to the second embodiment and the differences between the third embodiment and the second embodiment reside in the following. In the third embodiment, the blocking plate unit 6 of the series-connected absorption high-gravity device 1 further includes an auxiliary blocking plate 63' disposed above and spaced apart from the intermediate blocking plate 63, spaced apart from the housing 2, and extending in the radial direction transverse to the axis of the rotating shaft 4. The auxiliary blocking plate 63' has an auxiliary top surface 631', an auxiliary bottom surface 632', and an auxiliary blocking ring wall segment 633', and is formed with an auxiliary through hole 630'. The auxiliary bottom surface 632' is opposite to and disposed under the auxiliary top surface 631'. The auxiliary through hole 630' extends through the auxiliary top surface 631' and the auxiliary bottom surface 632'. The auxiliary blocking ring wall segment 633' extends upwardly from the auxiliary top surface 631' and surrounds the auxiliary through hole 630'. The intermediate through hole 630 has a projection area along the axis of the rotating shaft 4 that is smaller than a projection area of the auxiliary blocking plate 63', and that falls entirely within the projection area of the auxiliary blocking plate 63'. In this embodiment, the top blocking plate 62 is disposed above and spaced apart from the auxiliary blocking plate 63', and is spaced apart from the housing 2. The auxiliary through hole 630' has a projection area along the axis of the rotating shaft 4 that is smaller than the projection area of the top blocking plate 62 and that falls entirely within the projection area of the top blocking plate 62. It should be noted that the number of the auxiliary blocking plate 63' may be more than one, as long as the auxiliary through hole 630' of one of the auxiliary blocking plates 63' that is disposed adjacent to the top blocking plate 62 has a projection area along the axis of the rotating shaft 4 that is smaller than the projection area of the top blocking plate 62 and that falls entirely within the projection area of the top blocking plate 62, and the intermediate through hole 630 has a projection area along the axis of the rotating shaft 4 that is smaller than a projection area of one of the auxiliary blocking plate 63' which is disposed adjacent to said intermediate blocking plate 63, and that falls entirely within the projection area of the one of the auxiliary blocking plate 63'. In other words, the bottom through hole 610 has a projection area along the axis of the rotating shaft 4 that is smaller than the projection area of the top blocking plate 62, the auxiliary blocking plate 63', and the intermediate blocking plate 63, and that falls entirely within the projection area of the top blocking plate 62, the auxiliary blocking plate 63', and the intermediate blocking plate 63.

In the third embodiment, a gas flow such as an exhaust gas containing a portion of pollutants (e.g., alkaline gas) that has passed through the packed layer 32 flows upwardly, passes through the bottom through hole 610, the intermediate through hole 630, and the auxiliary through hole 630', a space between the housing 2 and the intermediate blocking plate 63, a space between the housing 2 and the auxiliary blocking plate 63', and a space between the housing 2 and the top blocking plate 62 in the airflow space 50, and then evenly flows into the scrubber layer 5 and comes into contact with a scrubbing solution that is dispersed by the scrubbing solution dispersing unit 9 in a countercurrent manner, so the scrubbing solution absorbs the portion of the pollutants (e.g., alkaline gas). The scrubbing solution that absorbs the portion of the pollutants (e.g., alkaline gas) flows sequentially along the top blocking plate 62, the auxiliary top surface 631' of the auxiliary blocking plate 63', the top surface 631 of the intermediate blocking plate 63, and the upper surface 611 of the bottom blocking plate 61 out of the housing 2 through the upper fluid discharging opening 23. In the third embodiment, by virtue of the structures of the auxiliary blocking ring wall segment 633', the auxiliary through hole 630' that has a projection area along the axis of the rotating shaft 4 smaller than the projection area of the top blocking plate 62 and falling entirely within the projection area of the top blocking plate 62, the scrubbing solution that absorbs pollutants does not flow into the fluid-flowing space 30 through the auxiliary through hole 630', the intermediate through hole 630 and the bottom through hole 610, and does not mix with the fluid introduced into the fluid-flowing space 30 introduced by the guiding tube 7.

It should be noted that, the structure and the number of the auxiliary blocking wall 63', the intermediate blocking wall 63, and the top blocking plate 62 may be modified according to actual requirements as long as the scrubbing solution does not flow into the fluid-flowing space 30 and mix with the fluid introduced by the guiding tube 7.

Figure 4:
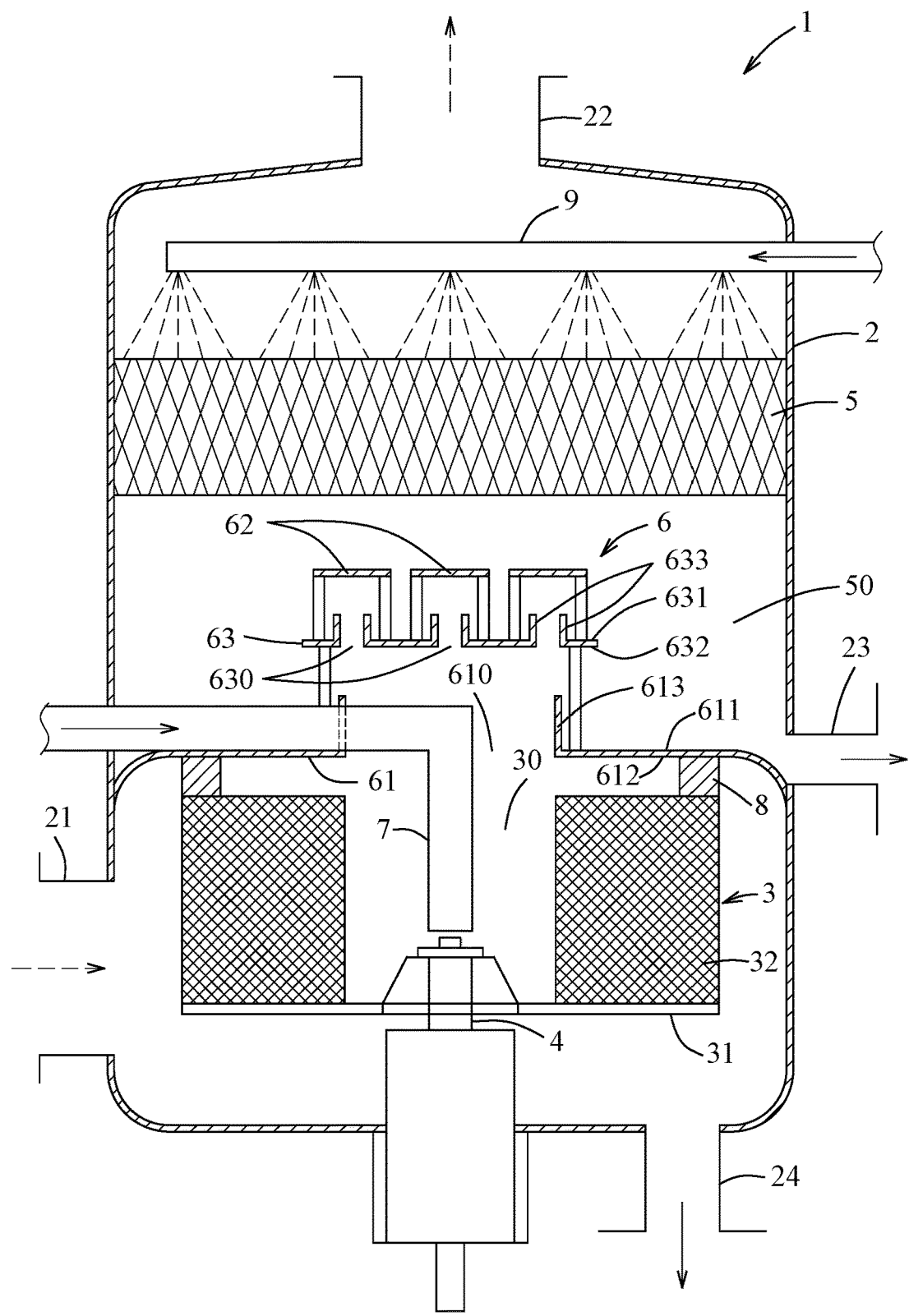
FIG. 4 is a schematic sectional view of a modification of the second embodiment.

For example, referring to FIG. 4, in a modification of the second embodiment, the blocking plate unit 6 includes the plurality of top blocking plates 62. The intermediate blocking plate 63 has a plurality of intermediate blocking ring wall segments 633 extending upwardly from the top surface 631, and is formed with a plurality of intermediate through holes 630 that are surrounded respectively by the intermediate block ring wall segments 633 and that are aligned respectively with the top blocking plates 62. Each of the intermediate through holes 630 has a projection area in a direction parallel to the axis of the rotating shaft 4 that is smaller than the projection area of the respective one of the top blocking plates 62 and that falls entirely within the projection area of the respective one of the top blocking plates 62. In this modification, a gas flow such as an exhaust gas containing a portion of pollutants (e.g., alkaline gas) that has passed through the packed layer 32 flows upwardly, passes through the bottom through hole 610, the intermediate through holes 630, a space between the intermediate blocking plate 63 and the housing 2, and a space between the top blocking plates 62 and the housing 2 in the airflow space 50, and then evenly flows into the scrubber layer 5 and comes into contact with a scrubbing solution that is dispersed by the scrubbing solution dispersing unit 9. The scrubbing solution that absorbs the portion of pollutants (e.g., alkaline gas) flows sequentially along the top blocking plates 62, the top surface 631 of the intermediate blocking plate 63, and the upper surface 611 of the bottom blocking plate 61 out of the housing 2 through the upper fluid discharging opening 23.

In the following description, some application scenarios of the present disclosure are illustrated. In a case where aqueous monoethanolamine (MEA) solution is employed as a fluid introduced into the fluid-flowing space 30 by the guiding tube 7 to remove carbon dioxide ($CO_2$) from a gas flow introduced into the housing 2, the gas flow that has been processed by the fluid may absorb a portion of the monoethanolamine that is volatile and flows into the scrubber layer 5 to be scrubbed by a scrubbing solution such as water that is dispersed by the scrubbing solution dispersing unit 9 for retrieving the monoethanolamine.

In another example, an acidic liquid is employed as a fluid introduced into the fluid-flowing space 30 to remove alkaline pollutants from an acid and basic waste gas introduced into the housing 2, and the gas flow that has been processed by the acidic liquid flows upwardly into the scrubber layer 5 to be scrubbed by an alkaline liquid that serves as the scrubbing solution to remove acidic pollutants. Similarly, an alkaline liquid may be employed as a fluid introduced into the fluid-flowing space 30 to remove acidic pollutants from a gas flow introduced into the housing 2, and the gas flow that has been processed by the alkaline liquid flows upwardly into the scrubber layer 5 to be scrubbed by an acidic liquid that serves as the scrubbing solution to remove alkaline pollutants.

In another example, a hydrophobic absorbent is employed as a fluid introduced into the fluid-flowing space 30 to remove hydrophobic pollutants from a gas flow containing various volatile organic compounds (VOCs) introduced into the housing 2, and a hydrophilic absorbent is employed as a scrubbing solution to absorb hydrophilic pollutants in the gas flow that has been processed by the hydrophobic absorbent. Similarly, a hydrophilic absorbent is employed as a fluid introduced into the fluid-flowing space 30 to remove hydrophilic pollutants from a gas flow introduced into the housing 2, and a hydrophobic absorbent is employed as a scrubbing solution to absorb hydrophobic pollutants in the gas flow that has been processed by the hydrophilic absorbent.

In yet another example, water serves as a fluid introduced into the fluid-flowing space 30 to remove particulate matters (PM) in the gas flow, and the gas flow that has been processed by water is scrubbed by a scrubbing solution capable of absorbing gas pollutants.

To sum up, by virtue of the structure of the blocking plate unit 6, different pollutants in a gas flow that is introduced into the housing 2 and that flows upwardly into the scrubber layer 5 may be first absorbed by the fluid introduced into the fluid-flowing space 30 and then scrubbed by the scrubbing solution dispersed by the scrubbing solution dispersing unit 9. Furthermore, the scrubbing solution that absorbs pollutants flows outwardly of the housing 2 via the upper fluid discharging opening 23, does not enter the fluid-flowing space 30 and thus would not mix with the fluid in the fluid-flowing space 30, which flows outwardly from the housing 2 via the lower fluid discharging opening 24. Therefore, a more effective and a smaller series-connected absorption high-gravity device 1 may both be realized.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A series-connected absorption high-gravity device, comprising:
   a housing that has
      a gas inlet adapted for introducing a gas flow into said housing,
      a gas outlet,
      an upper fluid discharging opening, and
      a lower fluid discharging opening disposed at a bottom portion of said housing;
   a rotating bed unit that is disposed in said housing, that is spaced apart from said housing, and that defines a fluid-flowing space therein;
   a rotating shaft that is connected to said rotating bed unit and that extends outwardly of said housing from said rotating bed unit;
   a scrubber layer that is disposed in said housing, that is disposed above and spaced apart from said rotating bed unit, and that cooperates with said rotating bed unit to define an airflow space therebetween, said gas outlet being disposed at a top portion of said housing and adapted for guiding a gas flow to flow out of said housing;
   a blocking plate unit that is disposed in said airflow space and that includes a bottom blocking plate connected fluid-tightly to said housing, having an upper surface and a lower surface that is opposite to said upper surface, and formed with a bottom through hole that extends through said upper surface and said lower surface, and that is in fluid communication with said fluid-flowing space and said airflow space, said upper fluid discharging opening being disposed adjacent to said upper surface of said bottom blocking plate, and
   a top blocking plate disposed above and spaced apart from said bottom blocking plate, and spaced apart from said housing, said bottom through hole having a projection area along an axis of said rotating shaft that is smaller than a projection area of said top blocking plate and that falls entirely within the projection area of said top blocking plate,
   a guiding tube that extends from an exterior of said housing into said fluid-flowing space, and that is adapted to introduce a fluid into said fluid-flowing space; and
   a scrubbing solution dispersing unit that is adapted to disperse a scrubbing solution into said scrubber layer.

2. The series-connected absorption high-gravity device as claimed in claim 1, wherein said bottom blocking plate further has a bottom blocking ring wall segment extending upwardly from said upper surface and surrounding said bottom through hole.

3. The series-connected absorption high-gravity device as claimed in claim 2, wherein said guiding tube extends from the exterior of said housing through said bottom blocking ring wall segment and said bottom through hole into said fluid-flowing space.

4. The series-connected absorption high-gravity device as claimed in claim 1, wherein said top blocking plate extends in a radial direction transverse to the axis of said rotating shaft.

5. The series-connected absorption high-gravity device as claimed in claim 1, wherein:

said rotating bed unit includes a base plate and a packed layer extending upwardly from said base plate;

said base plate and said packed layer cooperatively define said fluid-flowing space therebetween; and said rotating shaft is connected to said base plate of said rotating bed unit and extends from said base plate outwardly of said housing.

6. The series-connected absorption high-gravity device as claimed in claim 1, further comprising a sealing member that interconnects said lower surface of said bottom blocking plate and a top portion of said rotating bed unit.

7. A series-connected absorption high-gravity device, comprising:

a housing that has
  a gas inlet adapted for introducing a gas flow into said housing,
  a gas outlet disposed adjacent to a top portion of said housing,
  an upper fluid discharging opening, and
  a lower fluid discharging opening disposed at a bottom portion of said housing;

a rotating bed unit that is disposed in said housing, that is spaced apart from said housing, and that defines a fluid-flowing space therein;

a rotating shaft that is connected to said rotating bed unit and that extends outwardly of said housing from said rotating bed unit;

a scrubber layer that is disposed in said housing, that is disposed above and spaced apart from said rotating bed unit, and that cooperates with said rotating bed unit to define an airflow space therebetween, said gas outlet being disposed at a top portion of said housing and adapted for guiding a gas flow to flow out of said housing;

a blocking plate unit that is disposed in said airflow space and that includes a bottom blocking plate connected fluid-tightly to said housing, having an upper surface and a lower surface that is opposite to and disposed under said upper surface, and formed with a bottom through hole that extends through said upper surface and said lower surface, and that is in fluid communication with said fluid-flowing space and said airflow space, said upper fluid discharging opening being disposed adjacent to said upper surface of said bottom blocking plate, an intermediate blocking plate disposed above and spaced apart from said bottom blocking plate, spaced apart from said housing, having a top surface and a bottom surface that is opposite to said top surface, and formed with at least one intermediate through hole that extends through said top surface and said bottom surface, said bottom through hole having a projection area along an axis of said rotating shaft that is smaller than a projection area of said intermediate blocking plate and that falls entirely within the projection area of said intermediate blocking plate, and at least one top blocking plate disposed above and spaced apart from said intermediate blocking plate, and spaced apart from said housing, said intermediate through hole having a projection area along the axis of said rotating shaft that is smaller than a projection area of said top blocking plate and that falls entirely within the projection area of said top blocking plate;

a guiding tube that extends from an exterior of said housing into said fluid-flowing space, and that is adapted to introduce a fluid into said fluid-flowing space; and a scrubbing solution dispersing unit that is adapted to disperse a scrubbing solution into said scrubber layer.

8. The series-connected absorption high-gravity device as claimed in claim 7, wherein said intermediate blocking plate further has at least one intermediate blocking ring wall segment extending upwardly from said top surface and surrounding said at least one intermediate through hole.

9. The series-connected absorption high-gravity device as claimed in claim 8, wherein:

said at least one intermediate through hole includes a plurality of intermediate through holes;

said at least one intermediate blocking ring wall segment includes a plurality of intermediate blocking ring wall segments that respectively surrounds said intermediate through holes;

said at least one top blocking plate includes a plurality of top blocking plates that are disposed above and spaced apart from said intermediate through holes, respectively; and each of said intermediate through holes has a projection area in a direction parallel to the axis of said rotating shaft that is smaller than a projection area of the respective one of said top blocking plates and that falls entirely within the projection area of the respective one of said top blocking plates.

10. The series-connected absorption high-gravity device as claimed in claim 7, wherein said intermediate blocking plate extending in a radial direction transverse to the axis of said rotating shaft.

11. A series-connected absorption high-gravity device, comprising:

a housing that has
  a gas inlet adapted for introducing a gas flow into said housing,
  a gas outlet disposed adjacent to a top portion of said housing,
  an upper fluid discharging opening, and
  a lower fluid discharging opening disposed at a bottom portion of said housing;

a rotating bed unit that is disposed in said housing, that is spaced apart from said housing, and that defines a fluid-flowing space therein;

a rotating shaft that is connected to said rotating bed unit and that extends outwardly of said housing from said rotating bed unit;

a scrubber layer that is disposed in said housing, that is disposed above and spaced apart from said rotating bed unit, and that cooperates with said rotating bed unit to define an airflow space therebetween, said gas outlet being disposed at a top portion of said housing and adapted for guiding a gas flow to flow out of said housing;

a blocking plate unit that is disposed in said airflow space and that includes a bottom blocking plate connected fluid-tightly to said housing, having an upper surface and a lower surface that is opposite to and disposed under said upper surface, and formed with a bottom through hole that extends through said upper surface and said lower surface, and that is in fluid communication with said fluid-flowing space and said airflow space, said upper fluid discharging opening being disposed adjacent to said upper surface of said bottom blocking plate, an intermediate blocking plate disposed above and spaced apart from said bottom blocking plate, spaced apart from said housing, having a top surface and a bottom surface that is opposite to said top surface, and formed with an intermediate through hole that extends through said top surface and said bottom surface, said bottom through hole having a projection area along an axis of said rotating shaft that is smaller than a projection area of said intermediate blocking plate and that falls entirely within the projection area of said intermediate blocking plate, an auxiliary blocking plate disposed above and spaced apart from said intermediate blocking plate, spaced apart from said housing, having an auxiliary top surface and an auxiliary bottom surface that is opposite to said auxiliary top surface, and formed with an auxiliary through hole that extends through said auxiliary top surface and said auxiliary bottom surface, said intermediate through hole having a projection area along the axis of said rotating shaft that is smaller than a projection area of said auxiliary blocking plate and that falls entirely within the projection area of said auxiliary blocking plate, and a top blocking plate disposed above and spaced apart from said auxiliary blocking plate, and spaced apart from said housing, said auxiliary through hole having a projection area along the axis of said rotating shaft that is smaller than a projection area of said top blocking plate and that falls entirely within the projection area of said top blocking plate;

a guiding tube that extends from an exterior of said housing into said fluid-flowing space, and that is adapted to introduce a fluid into said fluid-flowing space; and a scrubbing solution dispersing unit that is adapted to disperse a scrubbing solution into said scrubber layer.

12. The series-connected absorption high-gravity device as claimed in claim 11, wherein said auxiliary blocking plate further has an auxiliary blocking ring wall segment extending upwardly from said auxiliary top surface and surrounding said auxiliary through hole.

13. The series-connected absorption high-gravity device as claimed in claim 11, wherein said auxiliary blocking plates extending in a radial direction transverse to the axis of said rotating shaft.

* * * * *